United States Patent [19]

Miller

[11] Patent Number: 5,323,502
[45] Date of Patent: Jun. 28, 1994

[54] WIRE STRIPPING TOOL

[76] Inventor: Christopher J. Miller, 1275 4th St. #207, Santa Rosa, Calif. 95404

[21] Appl. No.: 36,810

[22] Filed: Mar. 25, 1993

[51] Int. Cl.⁵ ............................................. H02G 1/12
[52] U.S. Cl. ........................................ 7/107; 30/90.6
[58] Field of Search ............... 7/107, 125, 132, 133, 7/134, 158; 30/90.6, 90.1, 90.4, 123, 131; 29/750, 751; 72/409, 410

[56] References Cited

U.S. PATENT DOCUMENTS

| | | | |
|---|---|---|---|
| 1,354,365 | 9/1920 | Aaron | 30/90.1 |
| 1,800,317 | 4/1931 | Ries et al. | 30/90.1 |
| 3,831,207 | 8/1974 | Boyajian | 7/107 |
| 3,947,905 | 4/1976 | Neff | 7/107 |
| 4,083,105 | 4/1978 | ViPond | 7/107 |
| 4,162,638 | 7/1979 | McCord | 30/90.1 |
| 4,625,596 | 12/1986 | Makus | 7/107 |

FOREIGN PATENT DOCUMENTS 2517873 10/1975 Fed. Rep. of Germany ....... 30/90.1

Primary Examiner—Roscoe V. Parker
Attorney, Agent, or Firm—Larry D. Johnson

[57] ABSTRACT

A multi-purpose wire stripping tool can be used to strip the insulation jacket from Romex-type electrical cable, strip the insulation from individual wires, cut the wires to a desired length, and crimp splice caps and sleeves onto joined wires. The tool includes a pair of opposed handle members joined at an axis portion and extending into a pair of opposed jaw members, the jaw members bearing a sleeve crimper portion, a wire cutter portion, and a wire stripper portion including a plurality of different wire gauge orifices. The jaw members terminate in a cable insulation jacket stripper portion perpendicularly disposed to the plane of the handle members.

8 Claims, 2 Drawing Sheets

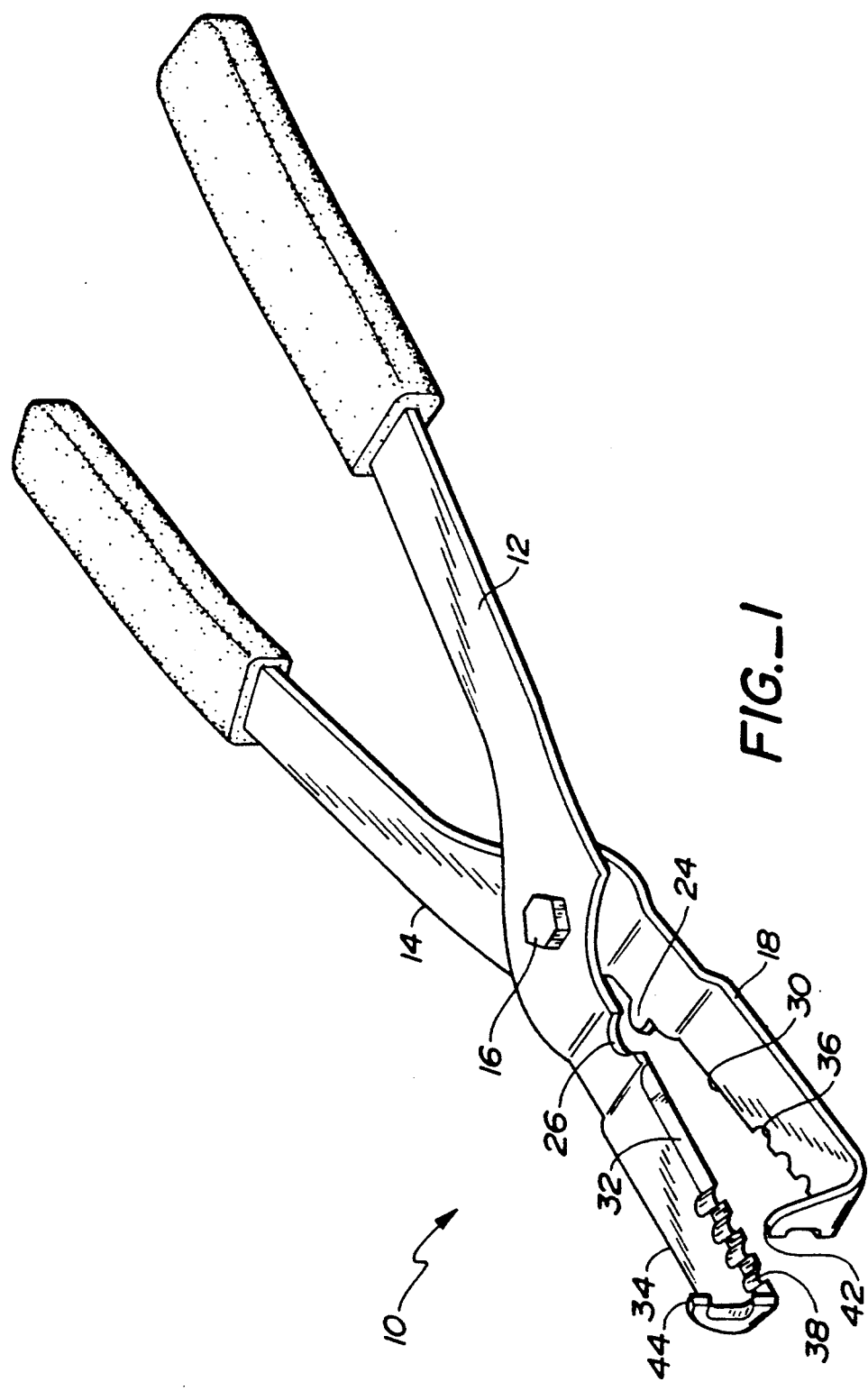

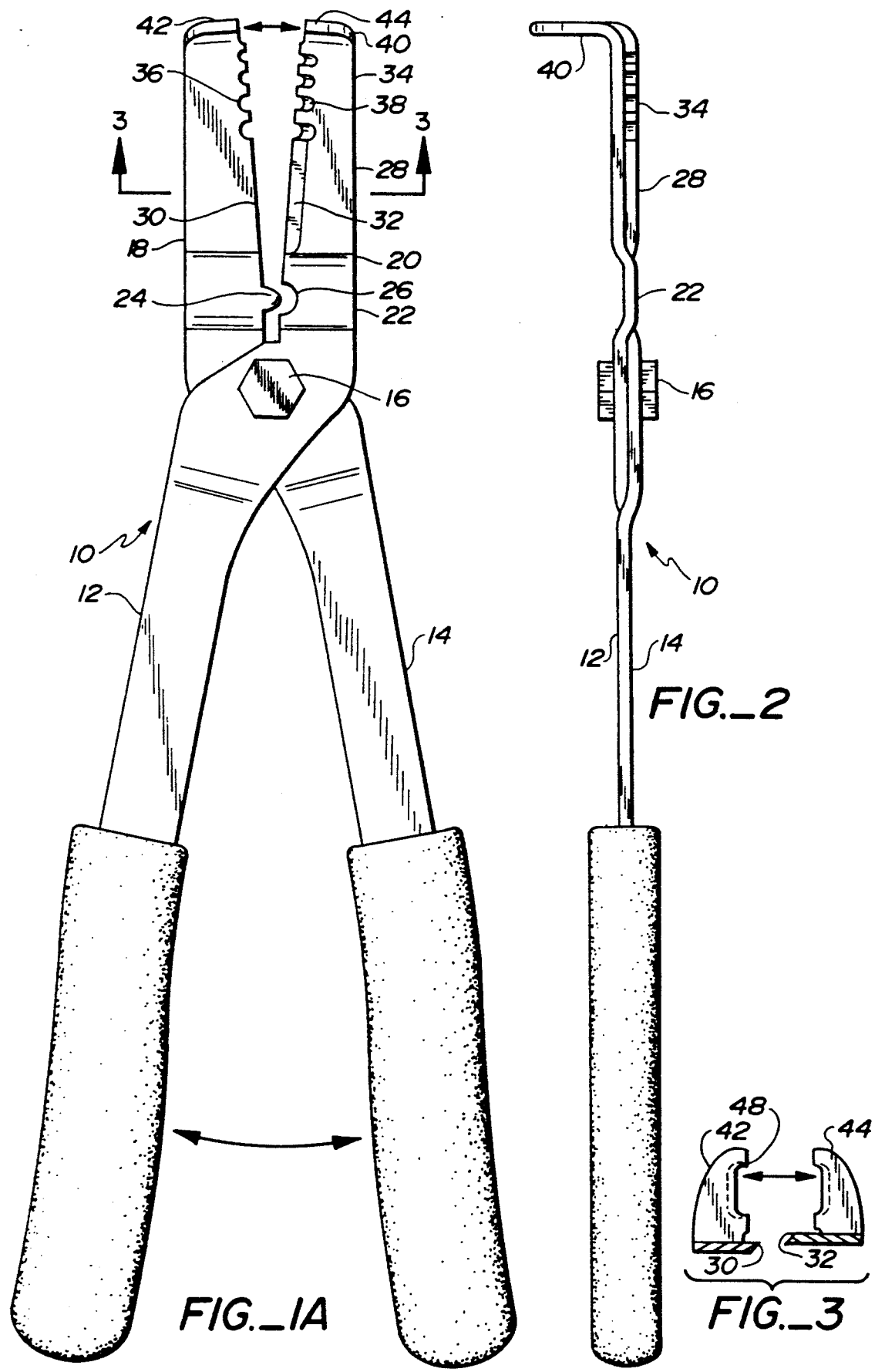

WIRE STRIPPING TOOL

BACKGROUND OF THE INVENTION

1. Field of the Invention

This invention relates generally to hardware and tools, and more specifically to an improved wire stripping tool for use with Romex-type electrical cable (wire rope).

2. Description of the Prior Art

Hand tools such as those used in electrical wiring installation are well known. Typically, such tools include pliers used for bending and pulling wires, knives or wire strippers used for removing insulation from wires, and crimping tools used for clamping sleeves or caps onto joined wires. Many such tools are "multi-purpose", that is, include the ability to perform two or more of these tasks. For example, H. M. Ocko U.S. Pat. No. 1,699,805 provides an electrician's tool bearing an exposed blade to cut an insulation jacket surrounding a pair of wires, and a wire stripping orifice to remove the insulation from an individual wire. However, such tools are generally ill-designed for removing the heavy insulation jacket or sheathing from Romex-type wire cable.

Sawyer et al. U.S. Pat. No. 5,062,192 provides a cable stripping tool that is suitable for cutting the insulation jacket from Romex-type cables. That tool includes a pair of hinged handles that bear a first pair of blades to slice across the insulation jacket, and a second pair of blades to slit the length of the insulation jacket and enable its removal from the insulated wires beneath. However, this tool may be difficult to use in the cramped spaces commonly associated with Romex cable installation, such as electrical junction boxes. In addition, this tool does not provide (and because of its structure would be difficult to incorporate) additional wire stripping and/or sleeve crimping features.

SUMMARY OF THE INVENTION

The wire stripping tool of this invention provides a multi-purpose tool that can be used to strip and remove the insulation jacket (cable sheath) from Romex-type electrical cable, strip the insulation from individual wires, cut the individual wires to a desired length, and crimp splice caps and sleeves onto joined wires. The inventive tool may be used for cutting and stripping cable and wire rope even after the cable has been pulled into an electrical junction box or other minimum-clearance location.

The wire stripping tool includes a pair of opposed handle members joined at an axis portion and extending into a pair of opposed jaw members, the jaw members bearing a sleeve crimper portion, a wire cutter portion, and a wire stripper portion including a plurality of different wire gauge orifices. The jaw members terminate in a cable insulation jacket stripper portion perpendicularly disposed to the plane of the handle members. This geometry enables the end of the tool to be inserted into otherwise cramped places (such as an electrical junction box) to capture an electrical cable, and to strip the insulation jacket from the cable. The individual wires may then be cut, stripped, and spliced, all by the appropriate portions of this single tool.

BRIEF DESCRIPTION OF THE DRAWINGS

FIG. 1 is a perspective view, and FIG. 1A is a front elevation view of the wire stripping tool of this invention, illustrating its component parts including a pair of opposed handle members joined at an axis portion and extending into a pair of opposed jaw members, the jaw members bearing a sleeve crimper portion, a wire cutter portion, a wire stripper portion including a plurality of different wire gauge orifices, and terminating in a cable insulation jacket stripper portion perpendicularly disposed to the plane of the handle members;

FIG. 2 is a side elevation view of the wire stripping tool of this invention illustrating the planar relationship of the opposed handle members, the jaw members sleeve crimper portion, and the jaw members insulation jacket stripper portion; and the offset/parallel planar relationship of the axis portion, the jaw members wire cutter portion and the jaw members wire stripper portion; and FIG. 3 is an end elevation cross-sectional view of the wire stripping tool of this invention, illustrating the cable-shaped gap defined by the opposed teeth of the jaw members perpendicularly-oriented insulation jacket stripper portion, and the offset/parallel planar relationship of the blades of the jaw members wire cutter portion, this view being taken along line 3—3 of FIG. 1.

DETAILED DESCRIPTION OF A PREFERRED EMBODIMENT

FIG. 1 is a perspective view, and FIG. 1A is a front elevation view of the wire stripping tool 10 of this invention, illustrating its component parts including a pair of opposed handle members 12, 14 joined at an axis portion 16 and extending into a pair of opposed jaw members 18, 20. The jaw members bear a sleeve crimper portion 22 including a detent element 24 and opposed indent element 26; a wire cutter portion 28 including opposed blades 30, 32; and a wire stripper portion 34 including a plurality of different wire gauge opposed blades/orifices 36, 38. The jaw members terminate in a cable insulation jacket stripper portion 40 consisting of opposed teeth 42, 44 perpendicularly disposed to the plane of the handle members.

The tool is preferably constructed of steel or other strong, hard material, and the handles 12, 14 may include a coating 46 of plastic or other insulating material. The handles may also include a spring (not illustrated) to urge the handles and jaws apart for ease in use.

FIG. 2 is a side elevation view of the wire stripping tool 10 of this invention illustrating the planar relationship of the opposed handle members 12, 14; the jaw members sleeve crimper portion 22; and the jaw members insulation jacket stripper portion 40. This view also illustrates the offset/parallel planar relationship of the axis portion 16; the jaw members wire cutter portion 28; and the jaw members wire stripper portion 34. The terminal position and perpendicular orientation of the insulation jacket stripper portion 40 enables the tool to reach into minimum-clearance locations such as electrical junction boxes, as described supra.

FIG. 3 is an end elevation cross-sectional view of the wire stripping tool of this invention, illustrating the cable-shaped gap 48 defined by the opposed teeth 42, 44 of the jaw members perpendicularly-oriented insulation jacket stripper portion 40, and the offset/parallel planar relationship of the blades 30, 32 of the jaw members wire cutter portion 28, this view being taken along line 3—3 of FIG. 1. Cable-shaped gap 48 is specifically sized to cut through the insulation jacket of Romex-type electrical cable, without cutting or otherwise affecting the individual insulated wires within.

The following is an example of appropriate use instructions that may be used for the wire stripping tool of this invention:

Features:

Strips sheathing from Romex-type cable.
a. yellow handles strips #12-2 w/ground.
b. red handles strips #14-2 w/ground.
Cuts Romex-type cable and individual wires.
Strips insulation from #10, #12, #14, and #16 solid wire; and #12, #14, #16, and #18 stranded wire.
Crimps Buchanan-type splice caps #22-10.
Small jaws on nose for pulling, bending wire.
Comfortable plastic covered handles.

How to use:

Place Romex-type cable into jaws, squeeze handles and pull off sheathing, exposing insulated wires.

Strip insulated wire by placing into properly sized hole, squeeze handles and pull insulation off end of wire.

To cut cable or wire, place between the blades and squeeze handles, easily severing the wires.

To crimp, place splice cap into crimping notch and squeeze handles exerting maximum hand pressure.

Not recommended for cutting hardened wire or twisting heavy objects. Never use on live electrical circuits. The plastic-covered handles are not intended for protection against electrical shock.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A wire stripping tool for use with electrial cable comprising:

a pair of opposed handle members joined at an axis portion and extending into a pair of opposed jaw members;

a sleeve crimper portion carried on said opposed jaw members, said sleeve crimper portion including an integral detent element and opposed integral indent element;

a wire cutter portion carried on said opposed jaw members, said wire cutter portion including opposed integral blades in an offset/parallel planar relationship;

a wire stripper portion carried on said opposed jaw members, said wire stripper portion including a plurality of different wire guage opposed integral blades/orifices in an offset/parallel planar relationship; and said opposed jaw members terminating in a cable insulation jacket stripper portion consisting of opposed integral teeth perpendicularly disposed to the plane of said opposed handle members.

2. The wire stripping tool of claim 1 wherein said tool is constructed of steel.

3. The wire stripping tool of claim 1 wherein said opposed handle members include a coating of an insulating material.

4. The wire stripping tool of claim 1 wherein said opposed handle members are in planar relationship.

5. The wire stripping tool of claim 1 wherein said sleeve crimper portion detent element and opposed indent element are in planar relationship.

6. The wire stripping tool of claim 1 wherein said cable insulation jacket stripper portion opposed teeth are in planar relationship.

7. The wire stripping tool of claim 1 wherein said axis portion includes a pair of sides in an offset/parallel planar relationship.

8. The wire stripping tool of claim 1 wherein said insulation jacket stripper portion opposed teeth define a cable-shaped gap.

* * * * *